United States Patent [19]

Hoy et al.

[11] Patent Number: 4,883,451
[45] Date of Patent: Nov. 28, 1989

[54] PAPER SCORING APPARATUS

[76] Inventors: Martin L. Hoy, 6409 63rd Pl., Riverdale, Md. 20737; Aubrey B. Hurst, 6200 Westchester Dr., College Park, Md. 20740

[21] Appl. No.: 267,315

[22] Filed: Nov. 4, 1988

[51] Int. Cl.⁴ .............................. B31F 1/00; B31F 1/36
[52] U.S. Cl. ..................................... 493/396; 239/283; 239/373; 493/480
[58] Field of Search ............... 493/396, 400, 401, 402, 493/403, 12; 222/527, 529; 239/283, 373, 587

[56] References Cited

U.S. PATENT DOCUMENTS

| | | | | |
|---|---|---|---|---|
| 1,089,402 | 3/1914 | Downing | .......................... | 493/396 |
| 3,117,725 | 1/1964 | Palmer | .......................... | 239/587 |
| 4,416,651 | 11/1983 | Sullivan et al. | .......................... | 493/12 |

Primary Examiner—Frederick R. Schmidt
Assistant Examiner—Jack W. Lavinder
Attorney, Agent, or Firm—Richard C. Litman

[57] ABSTRACT

A water scoring apparatus includes one or more needle assemblies adjustably carried upon a displaceable support bar transversely disposed atop a machine through which a sheet or web of paper is passed. A needle removably attached to a holder is in turn connected to a bracket joined to a mounting block on the support bar. The mounting block, bracket and holder all include adjustment mechanisms allowing for precise angular, vertical and transverse adjustment of the position of the needle tip with respect to the moving paper therebeneath. A pressurized source of liquid delivers fluid to a manifold on the support bar and which includes individual valves to regulate the flow of fluid to separate lines leading to the needles of each assembly.

10 Claims, 1 Drawing Sheet

PAPER SCORING APPARATUS

FIELD OF THE INVENTION

This invention relates generally, to a paper handling system and more particularly, to an improved apparatus for scoring paper, in preparation for folding thereof.

BACKGROUND OF THE INVENTION

In the printing industry, means are provided to fold paper stock as issuing from a printing press. In most instances such means comprises a purely mechanical operation wherein the sheet stock, after having been printed, is folded through an interaction of a plurality of rollers. Several parameters affect the efficiency and accuracy of such folding mechanisms such as the speed of the traveling stock, the type of folds desired, the stock composition and its weight.

An alternative method of folding may include the initial process of scoring the paper by the application of a bead of fluid upon the surface of the traveling paper stock. In such processes, referred to as water scoring, the applied fluid bead or line, serves to partially break down fibers of the paper stock and thus prepares the paper for a more accurate and efficient folding operation.

DESCRIPTION OF THE RELATED ART

Examples of apparatus for the water scoring of sheet or web paper stock will be found in Pat. No. 1,089,402 issued to Downing and wherein a gravity-fed water supply delivers fluid to sponges engaging a moving stock feed. Another example is disclosed in the patent to Koran, No. 3,198,092 which illustrates another gravity-fed water supply and which is connected to brush elements engageable with score rollers. With the present construction, a more precise control over the applied fluid bead is achieved, in a manner not seen to be suggested by the known prior art.

SUMMARY OF THE INVENTION

By the present invention, an improved water scoring apparatus is provided wherein one or more scoring assemblies are slidably mounted upon a longitudinal support bar with each assembly containing a needle type fluid applicator and with a plurality of displaceable components permitting of a most precise adjustment of the needle tip position, relative a moving sheet stock therebeneath. The fluid or liquid mixture delivered by the needles is preferably supplied from a pressurized source and its volume or rate of discharge is accurately regulated through a valved manifold mechanism, in series with the tubing supplying the needles. To facilitate maintenance of either the water scoring apparatus or the associated folding or printing apparatus, the support bar and all its attached needle assemblies, are pivotally mounted to permit a 90 degree displacement thereof. Additionally, sensing means are provided to detect an out-of-paper condition so as to automatically terminate the flow of fluid to the needle assemblies, in order to protect the machinery.

Accordingly, one of the objects of the present invention is to provide an improved water scoring apparatus for use with a paper stock feeding machine including, a support bar containing one more needle-type fluid dispensing devices mounted upon the bar by means allowing of position adjustment in a plurality of directions.

Another object of the present invention is to provide an improved water scoring apparatus including a needle housing mounted atop a moving sheet stock in a manner permitting of needle adjustment in an angular, transverse and longitudinal direction relative the moving stock.

Another object of the present invention is to provide an improved water scoring apparatus including a needle housing adjustably carried by an arm of a bracket in turn adjustably attached to a mounting block which is slidably engaged with a transverse support bar atop a moving sheet of paper stock.

A further object of the present invention is to provide an improved water scoring apparatus including a pressurized fluid supply leading to needle assemblies and with intermediate control devices for regulating the flow of fluid to the needle assemblies.

Still another object of the present invention is to provide an improved water scoring apparatus including one or more needle assemblies poised atop a moving sheet of paper stock, with a sensing mechanism operable to halt the flow of fluid to the needle assemblies upon the detection of a no-paper condition.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters designate corresponding parts throughout the several figures of the drawings.

DESCRIPTION OF THE PREFERRED EMBODIMENT

Figure 1:
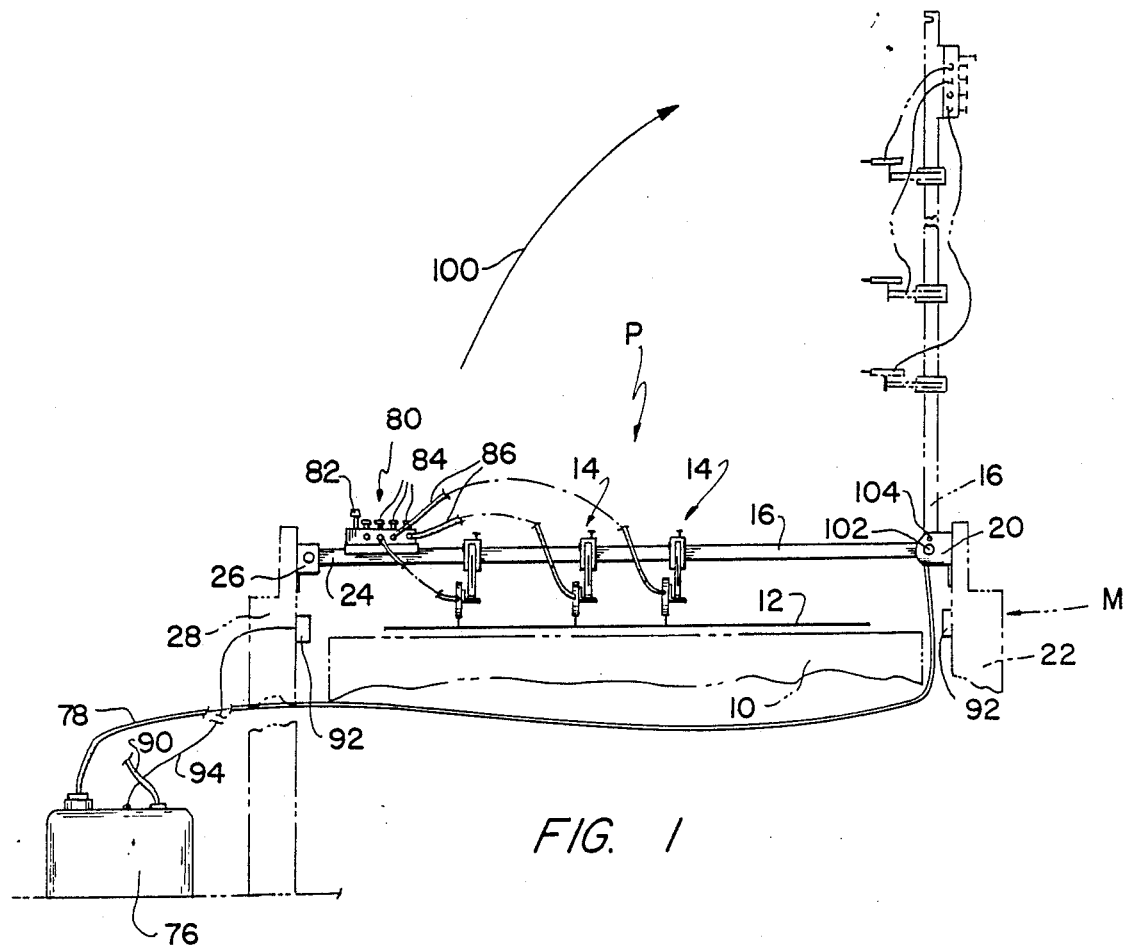
FIG. 1 is a fragmentary front elevation of the water scoring apparatus of the present invention.

Referring now to the drawings, particularly FIG. 1, the present invention will be seen to comprise a paper scoring apparatus, generally designated P, and which will be understood to be utilized in association with a paper handling machine, such as a printing press or folding machine M. The specific construction of the machine M may assume any of various well known devices including a support bed 10 over which sheet or web paper 12 passes and which paper stock is intended to be subsequently folded.

To prepare the paper 12 for the folding operation by any suitable known mechanism, scoring thereof is accomplished by the subject apparatus P, which will be understood to apply one or more precisely located beads or lines of fluid upon the moving paper 12. This fluid, preferably a water-alcohol solution, produces a breakdown of certain of the fibers of the paper stock, thereby defining exact lines which will subsequently become the fold lines as the stock is subjected to the folding apparatus being used. Inclusion of alcohol in the fluid solution has been found to accelerate the evaporation of the fluid following its intended reaction upon the paper fibers.

From the foregoing it will be appreciated that in such a system as proposed, the exact regulation of the fluid flow and its precise location and deposition upon the paper stock, will be of critical concern in order to maximize the accurate and efficient folding operation. In support of this goal, the fluid application is achieved by means of one or more needle assemblies 14 carried upon a support bar 16 extending the width of the paper handling machine M. As will be seen in the drawings, the support bar 16 includes a pivot end 102 attached to a bar bracket 20 in turn affixed to any stationary member such as a side wall 22 of the machine M. The opposite, free end 24 of the support bar 16 is adapted to engage a retaining member 26 carried by an opposite side wall 28 of the machine M.

Figure 2:
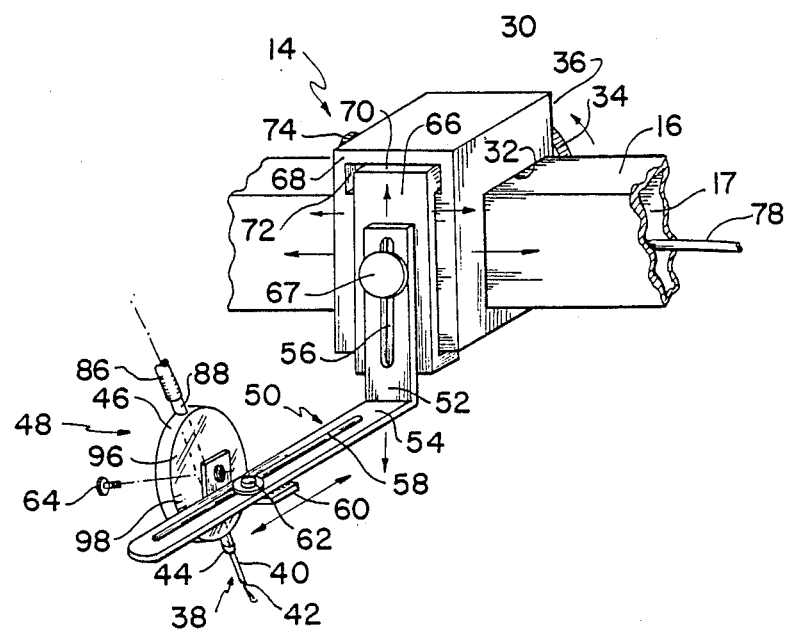
FIG. 2 is an enlarged perspective view of one of the needle assemblies shown in FIG. 1.

A typical construction of each needle assembly 14 is shown most clearly in the enlarged view of FIG. 2 wherein there is shown a mounting block 30 having a transverse aperture 32 adapted to closely surround the polygonal configuration of the support bar 16. The block 30 will thus be understood to be laterally shiftable along the length of the bar 16 and thus the full width of the underlying paper stock 12 and upon an initial selected positionion thereon, is fixed to the bar, as by a thumb screw or the like 34 such as mounted through the rear wall 36.

The mounting block 30 serves as the locating and support means for a hollow needle 38 having a shank 40 terminating in a shaped lower tip 42. It is this needle tip which is desired to be precisely located and supported atop the juxtaposed paper stock 12 and all of the attendant structure of the present invention is directed toward maintaining this precision of location and support. In this respect, the hub 44 of the needle 38 is removably attached to the periphery 46 of a needle holder 48 which is in turn carried by a support bracket 50 attached to the mounting block 30. The bracket 50 is seen to include a first or vertical arm 52 attached to the block 30 and from which extends a second or horizontal arm 54 to which the needle holder 48 is affixed. Both arms 52,54 are provided with longitudinal slots 56,58 respectively such that the vertical and longitudinal position of the needle holder 48 may be easily altered.

The needle holder 48 includes an attachment bracket 60 releasably secured to the support bracket arm 54 as by a fastener 62 while the holder may be secured to the attachment bracket 60 by means of a central fastener 64 in order to allow angular adjustment thereof. The first arm 52 of the support bracket 50 may be releasably secured directly to the mounting block 30 or, as shown in FIG. 2, secured to a laterally shiftable plate 66 captively retained against the face 68 of the block. With this latter construction, the plate includes a rearwardly directed tab 70 entering an opening 72 in the block face 68 and which is connected to a turn screw 74 through a side of the block. In this manner, a fine, vernier type of lateral adjustment of the needle holder 48 may be accomplished following the initial setting and locking of the block by means of the fastener 34 while vertical adjustment is made by means of a releasable fastener 67 connecting the bracket first arm 52 to the plate 66. To facilitate angular adjustment of the needle holder 48 about the axis of its attachment fastener 64, the side wall 96 may be provided with indicia 98 thereby reflecting the inclination of the holder with respect to the bracket arm 54.

The fluid solution to be delivered by any one of the needle assemblies 14 is supplied by an appropriate container 76 located adjacent the apparatus. This fluid is transmitted by a main flexible line 78 leading to a fluid control manifold 80 mounted upon the support bar 16. The line 78 enters the hollow interior 17 of the support bar, adjacent its pivotal attachment to the bracket 20.

The terminal portion of the line 78 exits the bar interior 17 adjacent the manifold 80. The flow of liquid into the manifold is controlled by a master flow control valve 82 and thence fluid flow is regulated through individual control valves 84 respectively communicating with separate, flexible fluid lines 86. Each fluid line 86 in turn is connected to the inlet fitting 88 of one needle holder 48. With this arrangment it will be understood that fluid forced form the container 76 may be specifically regulated, by means of the valves 84,84 to control the exact amount deposited upon the moving paper stock 12 by the needles 38. Since the unreliable gravity fluid feed as employed in prior water scoring devices is not utilized in this invention, it will follow that other means are relied upon to deliver the fluid from the remote source 76 of liquid solution. This means involves the application of pressure upon the fluid in the container 76 and may be accomplished in any suitable known manner such as by the application of controlled air pressure through an air line 90 as shown in FIG. 1 or by a pressure pump within the container.

As previously mentioned, any number of needle assemblies 14 may be mounted upon the support bar 16. Depending upon the number of folds which will be accomplished upon the paper stock, the required number of assemblies 14 are put into service by manipulating the various described lock members and lowering the appropriate support brackets 50 with needles 38 attached to the corresponding holders 48. Thereafter, as the machine M is running and the paper 12 moving, the proper solution flow is achieved by regulation of the valves 84,84.

Means are provided to halt the flow of liquid from the activated needles 38 should there be a paper break or when the end of the paper web has passed the needle tips. Such means comprises sensors, such as photocell element 92,92 on the machine side walls 22,28 and which sense any such abnormality in the paper feed. This derived signal may then be fed, as by the line 94 to a switch (not shown) serving to turn off the supply of pressure which forces the liquid from the container 76. Alternatively, the sensors 92 may regulate an electromechanical mechanism associated with the master fluid control valve 82 to accomplish the same result.

Should there be a paper jam in the machine M, or any other service requirement develops, the needle assembly 14 will need to be removed from its horizontal operating position. Likewise, to conduct repairs on any of the needle assembly components, the mechanism may need to be shifted fom the full line position as shown in FIG. 1. This action is readily accomplished by releasing the bar free end 24 from the retaining member 26 and swinging it upwardly, in the direction of the arrow 100, about the pivot 102, to a substantially vertical position, no less than 90 degrees from its horizontal, use position. The needle assembly 14 is retained in this elevated position by positive means such as a lock pin 104 in the bracket 20.

It is to be understood that the present invention is not limited to the sole embodiment described above, but encompasses any and all embodiments within the scope of the following claims.

What is claimed is:

1. A water scoring apparatus for paper or the like being moved through a machine comprising:
   an elongated bar,
   means supporting said bar in a substantially horizontal plane, a needle assembly on said bar,
said needle assembly including a mounting lock engaging said bar,
a support bracket projecting from said block,
a needle holder carried by said bracket,
a hollow needle removably attached to said holder,
releasable means connecting said bracket to said block and said holder to said bracket and permitting relative position adjustment between said holder, bracket and block,
a supply container adapted to hold fluid,
flexible fluid transmission means communicating between said container and needle, and
control means operable to regulate the flow of fluid from said container to said needle;
said bar supporting means includes a bracket on the machine and said bar includes one end pivotally attached to said machine bracket, whereby
said support bar is angularly displaceable from a horizontal position to an elevated position.

2. A water scoring apparatus according to claim 1 including,
a plurality of said needle assemblies on said support bar.

3. A water scoring apparatus according to claim 1 wherein,
said support bar includes a polygonal external configuration,
said mounting block having a transverse aperture therethrough, and
said bar disposed within said aperture and providing a close sliding fit therebetween.

4. A water scoring apparatus according to claim 1 wherein,
said support bracket includes a substantially vertical first arm joined to a substantially horizontal second arm,
said first and second arms each having a longitudinally extending slot therein, and
said releasable means including lock members disposed through said slots.

5. A water scoring apparatus according to claim 1 including,
a plate on said mounting block,
said bracket connected to said plate, and
adjusting means connecting said plate to said block, whereby
manipulation of said adjusting means laterally shifts said plate and connected bracket relative said block.

6. A water scoring apparatus according to claim 1 wherein,
said control means includes a valve in said transmission means.

7. A water scoring apparatus according to claim 6 including,
a plurality of said needle assemblies on said support bar,
said control means including a manifold in series in said transmission means, and
a plurality of said valves disposed in said manifold.

8. A water scoring apparatus according to claim 1 wherein,
said fluid supply container is disposed in a plane below that of said needle, and
means applying pressure to fluid within said container.

9. A water scoring apparatus according to claim 1 including,
sensor means on the machine connected to said control means and operable to cut off the flow of fluid from said container to said needle upon malfunction of the machine.

10. A water scoring apparatus according to claim 1 wherein,
said control means includes a manifold on said support bar,
said support bar having a hollow interior, and
said flexible fluid transmission means including a line leading from said container, disposed within said support bar interior and connected with said manifold.

* * * * *